United States Patent
Lundh et al.

(10) Patent No.: US 7,564,788 B2
(45) Date of Patent: Jul. 21, 2009

(54) FLOW CONTROL FOR LOW BITRATE USERS ON HIGH-SPEED DOWNLINK

(75) Inventors: Peter Lundh, Skärholmen (SE); Nádas Szilveszter, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 595 days.

(21) Appl. No.: 11/292,304

(22) Filed: Dec. 2, 2005

(65) Prior Publication Data

US 2007/0127522 A1 Jun. 7, 2007

(51) Int. Cl.
    *H04L 12/26* (2006.01)
(52) U.S. Cl. ..................................... 370/232
(58) Field of Classification Search .................. None
    See application file for complete search history.

(56) References Cited

U.S. PATENT DOCUMENTS

| | | | |
|---|---|---|---|
| 6,912,228 B1 | 6/2005 | Dahlman et al. | |
| 7,047,309 B2* | 5/2006 | Baumann et al. | 709/232 |
| 2003/0210660 A1* | 11/2003 | Wiberg et al. | 370/320 |
| 2004/0027997 A1 | 2/2004 | Terry et al. | |
| 2005/0018656 A1 | 1/2005 | Rudolf et al. | |
| 2005/0070319 A1 | 3/2005 | Pedersen | |
| 2005/0100038 A1 | 5/2005 | Pietraski et al. | |
| 2005/0207343 A1 | 9/2005 | Han | |
| 2006/0050723 A1* | 3/2006 | Yu | 370/412 |
| 2006/0146749 A1 | 7/2006 | Lundh et al. | |
| 2008/0069046 A1* | 3/2008 | Ishii et al. | 370/330 |

FOREIGN PATENT DOCUMENTS

| | | |
|---|---|---|
| EP | 1 432 262 A1 | 6/2004 |
| EP | 1 633 086 A2 | 3/2006 |
| WO | 02/085059 | 10/2002 |
| WO | 03/077579 A1 | 9/2003 |

OTHER PUBLICATIONS

International Search Report and Written Opinion mailed Mar. 9, 2007 in corresponding PCT application PCT/SE2006/050504.
3GPP TS 25.435 V6.2.0 (Jun. 2005), 3rd Generation Partnership Project; Technical Specification Group Radio Access Network; UTRAN $I_{ub}$ Interface User Plane Protocols for Common Transport Channel Data Streams (Release 6).

(Continued)

*Primary Examiner*—Chi H Pham
*Assistant Examiner*—Mohammad S Adhami
(74) *Attorney, Agent, or Firm*—Nixon & Vanderhye, P.C.

(57) ABSTRACT

A radio access network node (28) which provides High Speed Downlink Packet Access (HSDPA) comprises one or more priority queues ($50_i$) and a flow controller (60). The priority queue (50) stores data which is to be sent on a High Speed Downlink Shared Channel (HS-DSCH) over an air interface (32) to a mobile terminal (30). The data is received in the priority queue over an interface with a superior node in accordance with a capacity allocation determined by the radio access node. The flow controller (60) measures actual utilization of the capacity allocation for the priority queue and uses the actual utilization of the capacity allocation to adjust the capacity allocation.

9 Claims, 9 Drawing Sheets

OTHER PUBLICATIONS

3GPP TS 25.425 V6.2.0 (Jun. 2005), 3rd Generation Partnership Project; Technical Specification Group Radio Access Network; UTRAN Iur interface user plane protocols for Common Transport Channel data streams (Release 6).

3GPP TS 25.433. V6.6.0 (Jun. 2005), 3rd Generation Partnership Project; Technical Specification Group Radio Access Network; UTRAN Iub interface Node B Application Part (NBAP) signaling (Release 6).

Moulsley, T.J., et al. "Performance of UMTS High Speed Downlink Packet Access for Data Streaming Applications", Third International Conference on 3G Mobile Communication Technologies, 2002, (Conf. Publ. No. 489), May 8-10, 2002, pp. 302-307.

TSG RAN WG1, Change Request, 25.215 CR 134 V 5.2.0, 3GPP TSG-RAN Meeting 31, "Non-HSDPA Power Measurement" Feb. 2003, pp. 1-3.

Sophia Antipolis, RAN WG3, Change Request, 25.433 CR 801: "HS-DSCH: Addition of non HS-DSCH Power Measurement" 3GPP TSG-RAN3 Meeting 34, Feb. 17-21, 2003, pp. 1-18.

Evolving WCDMA For Improved High Speed Mobile Internet, Parkvall et al, Future Telecommunications Conference Nov. 2001.

$3^{rd}$ Generation Partnership Project; Technical Specification Group Radio Access Network, High Speed Downlink Packet Access, 3GPP TS 25.308 V5.2.0 (Mar. 2002).

3GPP TSG-RAN Meeting #31, Feb. 2003, Tdoc R1-030206.

U.S. Appl. No. 11/222,236, filed Sep. 9, 2005; Inventors: Englund et al.

Tech Spec, 3GPP TR 25.935 v4, 1.0, "$3^{rd}$ Generation Partnership Project (3GPP); Technical Specification Group Radio Access Network; Radio Resource Management (RRM); Optimization for Iur and Iub (Release 4)", Mar. 2002.

Tech. Spec, 3GPP TS 25.402 V6.0.0, "$3^{rd}$ Generation Partnership Project; Technical Specification Group Radio Access Network; Synchronisation in UTRAN Stage 2" (Release 6) Dec. 2003.

3GPP TSG-RAN WG2 #44, R2-042103, "Enhancements to Serving HS-DSCH Cell Change", Source: Nokia, France, Oct. 4-5, 2004.

* cited by examiner

FLOW CONTROL FOR LOW BITRATE USERS ON HIGH-SPEED DOWNLINK

BACKGROUND

1. Field of the Invention

The present invention pertains generally to telecommunications, and particularly to a High Speed Downlink Packet Access (HSDPA) system such as that operated (for example) in a Universal Mobile Telecommunications System (UMTS) terrestrial radio access network (UTRAN).

2. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology.

As wireless Internet services have become popular, various services require higher data rates and higher capacity. Although UMTS has been designed to support multi-media wireless services, the maximum data rate is not enough to satisfy the required quality of services.

In a forum known as the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSDPA). See, e.g., 3GPP TS 25.435 V6.2.0 (2005-06), 3rd Generation Partnership Project; Technical Specification Group Radio Access Network; UTRAN $I_{ub}$ Interface User Plane Protocols for Common Transport Channel Data Streams (Release 6), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.425 V6.2.0 (2005-06), 3rd Generation Partnership Project; Technical Specification Group Radio Access Network; UTRAN Iur interface user plane protocols for Common Transport Channel data streams (Release 6); and 3GPP TS 25.433 V6.6.0 (2005-06), 3rd Generation Partnership Project; Technical Specification Group Radio Access Network; UTRAN Iub interface Node B Application Part (NBAP) signaling (Release 6).

High Speed Downlink Packet Access (HSDPA) is discussed in one or more of the following (all of which are incorporated by reference herein in their entirety):

U.S. patent application Ser. No. 11/024,942, filed Dec. 30, 2004, entitled "FLOW CONTROL AT CELL CHANGE FOR HIGH-SPEED DOWNLINK PACKET ACCESS";

U.S. patent application Ser. No. 10/371,199, filed Feb. 24, 2003, entitled "RADIO RESOURCE MANAGEMENT FOR A HIGH SPEED SHARED CHANNEL".

PCT Patent Application PCT/SE2005/001247, filed Aug. 26, 2005;

PCT Patent Application PCT/SE2005/001248, filed Aug. 26, 2005.

The HSDPA system provides, e.g., a maximum data rate of about 10 Mbps. FIG. 6 illustrates a high-speed shared channel concept where multiple users 1, 2, and 3 provide data to a high speed channel (HSC) controller that functions as a high speed scheduler by multiplexing user information for transmission over the entire HS-DSCH bandwidth in time-multiplexed intervals (called transmission time intervals (TTI)). For example, during the first time interval shown in FIG. 6, user 3 transmits over the HS-DSCH and may use all of the bandwidth allotted to the HS-DSCH. During the next time interval, user 1 transmits over the HS-DSCH, the next time interval user 2 transmits, the next time interval user 1 transmits, and so forth. FIG. 6 is a simplification since more than one user can be scheduled in a TTI.

HSDPA achieves higher data speeds by shifting some of the radio resource coordination and management responsibilities to the base station from the radio network controller. Those responsibilities include one or more of the following (each briefly described below): shared channel transmission, higher order modulation, link adaptation, radio channel dependent scheduling, and hybrid-ARQ with soft combining.

In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

The radio base station monitors for the carrier quality (CQI) of the high-speed downlink shared channel (HS-DSCH) and manages a priority queue maintained at the radio base station. The base station's priority queue (PQ) stores data which is to be sent on the high-speed downlink shared channel (HS-DSCH) over the air interface to the mobile terminal. In addition, knowing from the monitor the carrier quality of the HS-DSCH, the base station sends to the control node messages which authorize the control node to send more HS-DSCH data frames to the radio base station.

The mobile terminal reports a carrier quality indicator (CQI) to the radio base station in charge of the cell. The CQI is a measure of the quality of the common pilot CPICH as reported by each mobile station (e.g., each user equipment unit ("UE")). The carrier quality indicator (CQI), together with an expression(s) of capabilities of the mobile terminal, is translated to a bitrate. The bitrate is then further reduced if needed by the radio base station, which results in generation of capacity allocation control frames which are sent to the control node regularly and/or per need bases, e.g. at urgent transitions. The authorizing messages include a "capacity allocation" which can be expressed in various ways, such as in terms of either bitrate or credits, for example. For example, capacity allocation expressed in credits may refer to a number of MAC-d PDUs that the radio network controller (RNC) is allowed to transmit for the MAC-d flow. In response to these authorizing messages, the control node sends further HS-DSCH frames to the radio base station.

The data in the priority queues is sent from a control node to a radio base station in protocol data units (PDUs). A number of PDUs may be included in each high-speed downlink shared channel (HS-DSCH) data frame.

Although HSDPA has been subject to much discussion, and the messages which transmit the capacity allocation have been standardized, no particular flow control algorithm for HSDPA has been standardized. See, e.g., 3GPP TS 25.435 V6.2.0 (2005-06), 3rd Generation Partnership Project; Technical Specification Group Radio Access Network; UTRAN $I_{ub}$ Interface User Plane Protocols for Common Transport Channel Data Streams (Release 6), which is incorporated herein by reference in its entirety, including but not limited to §5.10 and §6.3.3.11 thereof which refer to HS-DSCH Capacity Allocation.

Some type of Iub Flow Control will have to be provided between RNC and RBS. Such Iub Flow Control will calculate the Capacity Allocation messages which are sent to the RNC, so that the RNC can send HS-DSCH Data Frames towards RBS according to the Capacity Allocations (CA), there being one Capacity Allocation for each flow (i.e., one Capacity Allocation for each priority queue flow (PQF)). Such Flow Control algorithm should ensure good end-user perceived data transmission.

A nominal Iub Flow Control approach assumes that the real user bitrate is what the Capacity Allocation control frames grant. In the nominal approach, the overall bit rate for the radio base station is equal to the sum of the fully allocated bit rates for each active flow. Since the bitrate for each flow is presumed in the nominal approach to be the full bitrate granted by the Capacity Allocation message, the bit rate for an individual flow is set to the Capacity Allocation for the respective flow.

In a HSDPA system there are generally two basic bottlenecks. One of the bottlenecks is on the downlink on the air-interface (Uu) between the radio base station node (RBS) and the mobile station; the other bottleneck is on the downlink on the interface (Iub) between the radio network controller node and the radio base station node. Both of these bottlenecks should be considered in a flow control algorithm. The available HS bandwidth over the Iub interface varies considerably. If too much HS traffic is allocated over Iub, frame losses and long delays degrade the HS packet data performance. The air interface scheduling of HS-DSCH Data Frames is controlled by the RBS.

When a priority queue flow (PQF) does not use the capacity allocated for it by its capacity allocation (CA) messages, then the Iub Transport Network will be under-utilized. The reason is that the PQF's share from the available capacity is reserved for the PQF, but it is not used.

There may be several reasons for why a Capacity Allocation bitrate is not fully used. As a first reason, the radio network controller (RNC) may limit the HSDPA HS-DSCH Data Frames bitrate with the RAB attribute "Iu Max bitrate" parameter (which could be set by operator as a function of subscription type, e.g. limited by operator to 64, 128 or 384 kbps or any other value (these examples just happen to be DCH bitrate look-alike limits)). As a second potential reason, there may be a bottleneck between the application server and SRNC, which could happen during certain time periods in some networks. A third plausible reason is that an application involved in the flow may not use more than a certain low bitrate during a certain period of time. A fourth possible reason is that traffic is bursty, e.g., one packet at a time (e.g. from a web page) is downloaded with big bitrate differences.

FIG. 7 illustrates that low bitrate bottlenecks are found 'above' the HSDPA Iub Flow Control Algorithm, i.e. above the radio network controller (RNC). The bottlenecks in the Application server, in the Serving RNC (SRNC) as the Iu Max Bitrate or the service network transport network in between those two nodes.

Thus, the nominal approach for HSDPA flow control does not consider situations where users in fact use much lower bitrates than granted in the Capacity Allocation messages. For example when a capacity allocation (CA) of 1 Mbps is sent to RNC, a user might use only 100 kbps.

The problem of the nominal HSPDA flow control approach is that capacity allocations (CAs) are reduced as a function of the active priority queue flows' capacity allocations. Capacity allocation (CA) bitrates are reduced if the total capacity allocation (CA) bitrates for all the active users are higher than the available Iub bitrate. This is done regardless of whether users are actually utilizing the full capacity allocation (CA) bitrate or not. As explained above, users not using the capacity allocation (CA) bitrate could be users with an application with limited bitrate, users experiencing a bottleneck anywhere between the 'server' and the RBS, or users limited by the RAB attribute Iu Max Bitrate.

FIG. 8A-FIG. 8D reflect a simulation example which illustrates problems with the nominal HSDPA Flow approach. In the simulation, there are ten users in a three-cell RBS, all of the users downloading large files. A new user arrives every twenty seconds until there are ten users in the system. Users 0, 3, 6, 9 reside in the first cell; users 1, 4, 7 reside in the second cell; while other users are in the third cell of the same RBS. All users are limited by Iu Max Bitrate 100 kbps except users 0 and 5. The RBS is connected to the radio network controller (RNC) using an E1 link.

FIG. 8A depicts the amount of transport network resources to be distributed and the sum of capacity allocation (CA) rates allocated for all priority queues (sumCAR). FIG. 8B shows incoming and outgoing PDU rate in the RBS. High initial Iub bitrate utilization occurs until later users enter the system, the later users not fully using their granted capacity allocation (CA). FIG. 8B depicts the incoming PDU rate to the RBS (in All), and the outgoing PDU rate from the RBS (out). The incoming bitrate of inactive users also depicted, but is zero in case of this simulation. It can be seen from FIG. 8B that at the beginning the rates are much higher than later. The later degradation of transport network utilization is caused by the users who do not use their allocated bandwidth. The average utilization of the transport network was also measured during the simulation and resulted in 62%.

FIG. 8C depicts average capacity allocation (CA) bitrate utilization for Priority Queue 0. In FIG. 8C and FIG. 8D, the Capacity allocated for the given user and the capacity used by the given user (Incoming PDU bitrate) is depicted for users 0 and 4, respectively. It can be seen that user 4 does not use more than 100 kbps capacity even if much more is allocated for user 4. On the other hand, user 0 uses all the capacity allocated to user 0, it is limited by its capacity allocation.

The foregoing simulation illustrates that the nominal HSDPA flow control approach cannot utilize the transport network resources in the case when some of the users do not use their allocated bandwidth.

What is needed, therefore, and an object herein provided for, are means, methods, and techniques for effectively utilizing transport network resources for a high-speed downlink shared channel (HS-DSCH) in the case when some of the users do not use their allocated bandwidth

SUMMARY

A radio access network node which provides High Speed Downlink Packet Access (HSDPA) comprises one or more priority queues and a flow controller. The priority queue stores data which is to be sent on a High Speed Downlink Shared Channel (HS-DSCH) over an air interface to a mobile terminal. The data is received in the priority queue over an interface with a superior node in accordance with a capacity allocation determined by the radio access node. The flow controller measures actual utilization of the capacity allocation for the priority queue, and uses the actual utilization of the capacity allocation to adjust the capacity allocation.

In one example implementation, the flow controller, for measuring the actual utilization of the capacity allocation for the priority queue, is arranged to detect a number of arrived protocol data units (PDUs) for the priority queue within a given time interval, and is further arranged to compare the number of arrived protocol data units (PDUs) to the capacity allocation for the priority queue for the given interval.

In another aspect of operation, for adjusting the capacity allocation the flow controller is also arranged to divide transport network resources among different plural priority queues. This division of transport network resources is accomplished, in an example implementation, by multiplying a resource use of a given priority queue with the actual utilization of the capacity allocation for the priority queue.

In another aspect, the flow controller averages measurements of the actual utilization of the capacity allocation for the priority queue, thereby, avoiding the issue of considering different duty cycles of the data flows.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
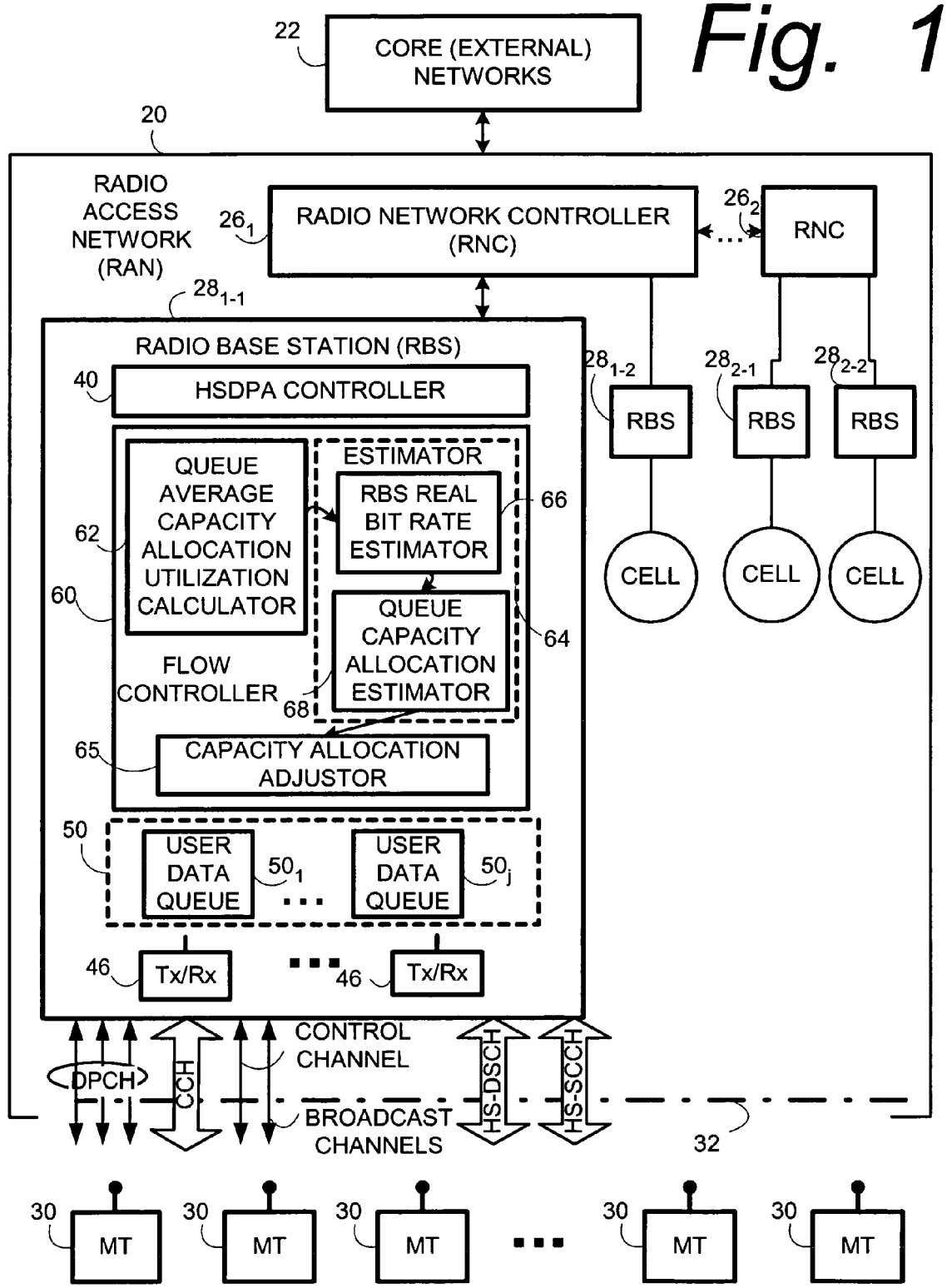
FIG. 1 is schematic view of example mobile communications system in which a HSDPA flow controller may be advantageously employed.

FIG. 1 illustrates an example, non-limiting telecommunications system wherein a radio access network 20 is connected to one or more external (e.g., core) networks 22. The external networks 22 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN).

Each of the core network service nodes connects to the radio access network (RAN) 20 over a suitable interface. In the particular, non-limiting example shown in FIG. 1, the radio access network (RAN) 20 is a UMTS Terrestrial Radio Access Network (UTRAN) and the interface with the external network is over the Iu interface. The radio access network (RAN) 20 includes one or more radio network controllers (RNCs) 26 and one or more radio base stations (RBS) 28. For sake of simplicity, the radio access network (RAN) 20 of FIG. 1 is shown with only two RNC nodes, particularly RNC $26_1$ and RNC $26_2$. Each RNC 26 is connected to one or more base stations (BS) 28 over an Iub interface. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the UTRAN 24. Further, those skilled in the art will also appreciate that a base station is sometimes also referred to in the art as a radio base station, a node B, or B-node. In the example of FIG. 1, a radio network control node is considered a "superior" node to a radio base station node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 28 is shown as serving one cell. For base station $28_{1-2}$, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

As shown in FIG. 1, mobile terminals (MT) 30 communicates with one or more cells or one or more base stations (BS) 28 over a radio or air interface 32. In differing implementations, the mobile terminals (MT) 30 can be known by different names, such as wireless terminal, mobile station or MS, user equipment unit, handset, or remote unit, for example. Each mobile terminal (MT) may be any of myriad devices or appliances, such as mobile phones, mobile laptops, pagers, personal digital assistants or other comparable mobile devices, SIP phones, stationary computers and laptops equipped with a real-time application, such as Microsoft netmeeting, Push-to-talk client etc. Preferably, at least for a UTRAN implementation of the radio access network (RAN) 20, radio access is based upon Wideband, Code Division Multiple Access (WCDMA) with individual radio channels allocated using CDMA spreading codes. Of course, other access methods may be employed.

FIG. 1 further illustrates in simplified form that different types of channels may exist between one of the base stations 28 and mobile terminals (MT) 30 for transport of control and user data. For example, in the forward or downlink direction, there are several types of broadcast channels, one or more control channels, one or more common traffic channels (CCH), dedicated traffic channels (DPCH), and the highspeed downlink shared channel (HS-DSCH) which now is of particular interest. The downlink dedicated physical channel (DPCH) carries both the Dedicated Physical Data Channel (DPDCH) and the Dedicated Physical Control Channel (DPCCH).

The RNC 26 configures the cell to support HSDPA. Thereafter it is up to the RBS 28 to allocate power and the amount of codes needed at respective TTI transmissions.

Base stations provided with high-speed downlink packet access capability have a high-speed downlink packet access controller, e.g., HSDPA scheduler 40 or similar channel manager that governs allocation and utilization of the high-speed downlink shared channel (HS-DSCH) and a high-speed shared control channel (HS-SCCH) which is utilized for signaling purposes. The HSDPA controller is commonly referred to also as HSDPA scheduler 40. The HS-SCCH contains information which is sent to the mobile terminals so that the mobile terminals know if they have data to receive on the HS-PDSCh channel or not. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI.

The HSDPA scheduler 40 may be included with or separate from a node controller or the like which bears responsibility for overall operation/coordination of the RBS node. Further, the HSDPA scheduler 40 may be implemented using individual hardware circuits, using software programs and data in conjunction with one or more suitably programmed digital microprocessors or general purpose computers, using application specific circuitry (ASIC), and/or using one or more digital signal processors (DSPs).

Various functionalities of HSDPA scheduler 40 and HSDPA-related entities of radio base station 28 not described herein are understood with reference to U.S. patent application Ser. No. 11/024,942, filed Dec. 30, 2004, entitled "FLOW CONTROL AT CELL CHANGE FOR HIGH-SPEED DOWNLINK PACKET ACCESS"; which is incorporated herein by reference. Of the constituent elements that art shown, radio base station 28 has plural transceivers (Rx/Tx) 46.

As further shown in FIG. 1, radio base station (RBS) 28 includes a set of user data queues 50, including priority queues (PQ) $50_1$ through $50_j$, through which user data passes (as a priority queue (PQ) flow (PQF)) when applied to highspeed downlink shared channel (HS-DSCH). By monitoring the user data queues $50_i$, i=1, . . . j, the radio base station (RBS) 28 knows how much data a user i has in his respective user data queue $50_i$.

For each priority queue (PQ) 50, the radio base station generates capacity allocation control frames which are sent to the radio network control node (RNC) 26 regularly and/or per need bases, e.g. at urgent transitions. These authorizing messages include a "capacity allocation". In response to these authorizing messages and in response to the capacity allocation in particular, the radio network control node (RNC) 26 (as the "superior" node) sends further HS-DSCH frames to the radio base station over the Iub interface.

As also shown in FIG. 1, the radio base station (RBS) 28 also includes and/or executes a HSDPA flow control process, and in this sense is also known as a (HSDPA) flow controller 60. The HSDPA flow controller 60, among other things, generates the capacity allocation authorizing messages mentioned above. As also mentioned above, some priority queues may not fully utilize the authorized capacity allocation. To rectify this situation, the HSDPA flow controller 60 includes a calculator 62 which calculates the average capacity allocation utilization for each active priority queue 50 involved in the HSDPA, an estimator 64; and, a capacity allocation adjuster 65. The estimator 64 in turn includes RBS real bit rate estimator 66 and queue capacity allocation updater/estimator 68.

Figure 2:
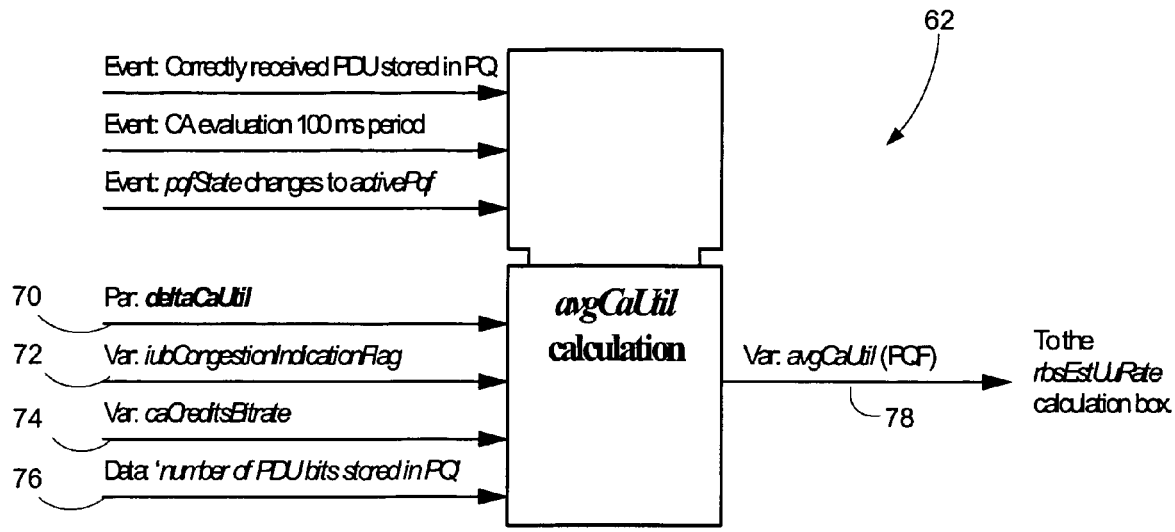
FIG. 2 is a diagrammatic view of events, inputs, and outputs of a calculator of the HSDPA flow controller of FIG. 1.

The calculator 62 serves to calculate an average capacity allocation utilization for each active priority queue (PQ) handled by the radio base station (RBS) 28. In the non-limiting example implementation illustrated, a parameter avgCaUtil(PQF) represents the average capacity allocation utilization for a priority queue. FIG. 2 shows events, inputs, and outputs of an example embodiment of calculator 62. Inputs to calculator 62 include a parameter deltaCaUtil 70; a variable known as iubCongestionIndicationFlag 72; a variable caCreditsBitrate 74; and a number 76 of PDU bits stored in a priority queue (PQ) during the evaluation period. Output of calculator 62, e.g., the above-mentioned average capacity allocation utilization for a priority queue (avgCaUtil(PQF)), is represented by reference numeral 78 in FIG. 2.

The estimator 64 performs two estimates. The first estimate (depicted by example variable estUuRate) is the estimated bitrate a priority queue (PQ) can have on the air interface assuming the current radio conditions. This first estimate (e.g., estUuRate) is an important factor for adjusting the Capacity Allocation (CA) bitrate. The second estimate (depicted by example variable rbsEstUuRate) is the sum of the estimated bitrates (i.e., estUuRate) for all priority queues (PQs) in an active state, i.e., all active priority queues.

Figure 3:
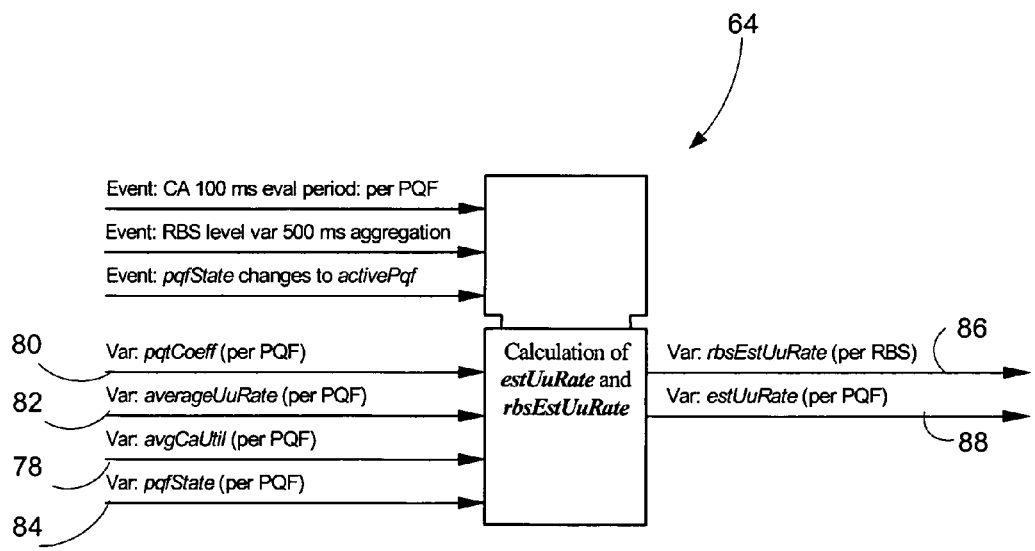
FIG. 3 is a diagrammatic view of events, inputs, and outputs of an estimator of the HSDPA flow controller of FIG. 1.

FIG. 3 shows events, inputs, and outputs of an estimator 64 according to an example embodiment. Inputs to estimator 64 include (for each priority queue (PQ)) the above-mentioned average capacity allocation utilization for a priority queue variable (avgCaUtil(PQF) 78) which is calculated by calculator 62; a variable known as pqt Coeff(per PQF) 80; a variable known as averageUuRate(per PQF) 82; and, a variable known as pqfState(per PQF) 84. Outputs of the estimator 64 include the variable rbsEstUuRate 86 and (optionally) the variable estUuRate(per PQF).

Figure 4:
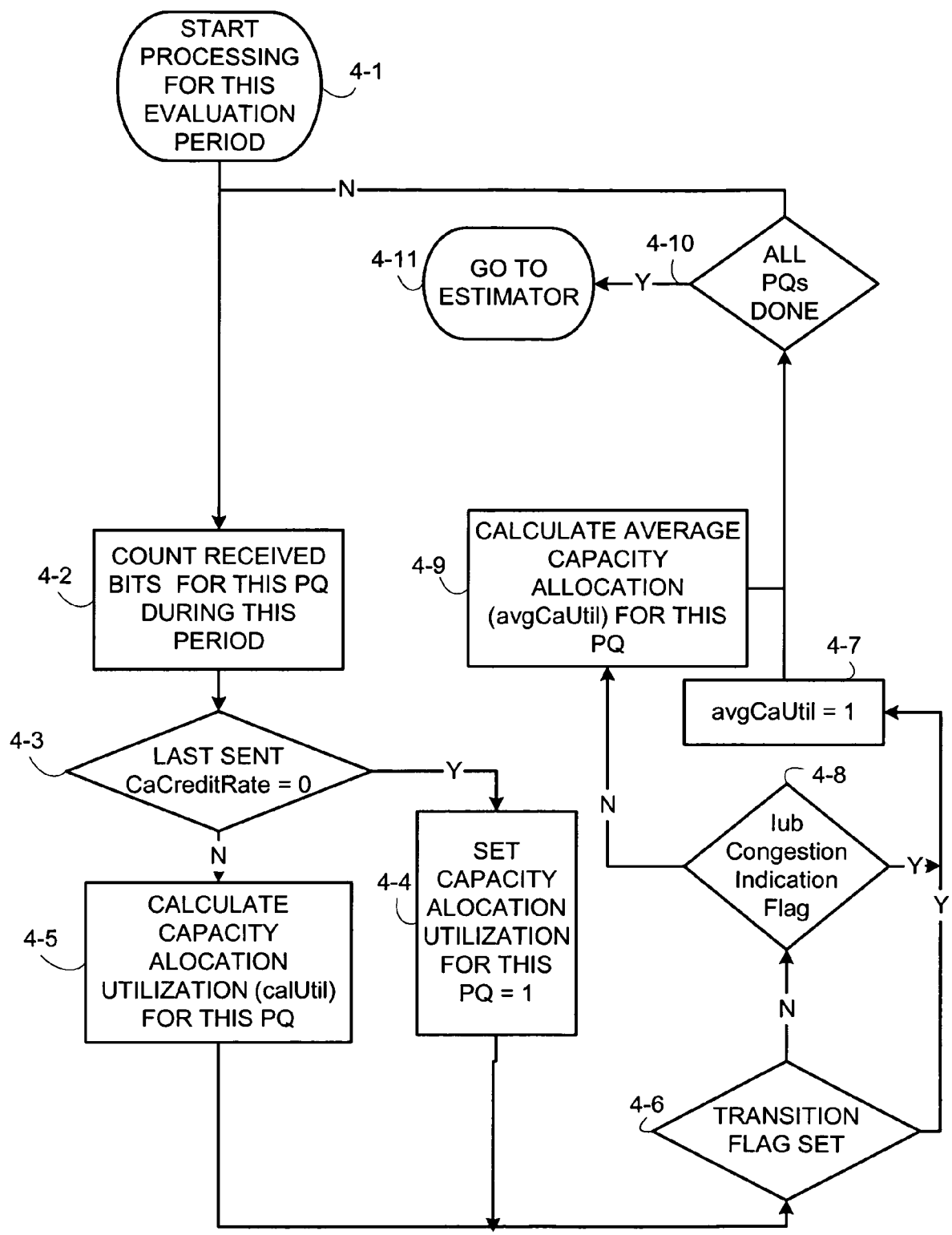
FIG. 4 is a flowchart showing basic, example, representative steps or actions performed by the calculator of FIG. 2.

FIG. 4 illustrates basic, non-limiting example steps, events, or actions of a calculation routine performed by example calculator 62. The calculator 62 generates the new variable avgCaUtil 78 for feeding to estimator 64, with an objective of estimator 64 being executed to lower the value of the variable rbsEstUuRate 86 output by estimator 64 and thereby reflecting the under-utilization by users that use lower bitrates than granted via the Capacity Allocations sent to SRNC. In the ensuing discussion of FIG. 4, it will be understood that each priority queue (PQ) flow (PQF) has its own set of variables.

Step 4-1 of the example calculation progress logic of FIG. 4 reflects the fact that calculator 62 is ready to process information for a PQF evaluation period. For each priority queue (PQ) the evaluation period lasts as approximately one PQF 100 ms evaluation period, the evaluation being aligned with the RBS implementation where each PQF normally is evaluated every 100 ms. In the illustration of FIG. 4 it is assumed for simplification that all active priority queues (PQs) are processed essentially simultaneously. However, it will be understood that the processing can be staggered for the priority queues, with a skew relative other PQFs to average out processing load, divided by a CaCreditsBitrate value that is valid for the same period.

The calculation logic of FIG. 4 serves to compute an average capacity allocation utilization separately for each active priority queue (PQ). Toward this objective, the calculation logic comprises a loop of steps 4-2 through 4-10, with appropriate steps of the loop being executed for each priority queue (PQ) of the radio base station (RBS) 28 which is involved in the HSDPA. A first execution of the loop is for a first priority queue such as priority queue (PQ) $50_1$, a second execution of the loop is for a second priority queue such as priority queue (PQ) $50_2$, and so forth until all priority queues are processed. For each execution of the loop, reference to "this priority queue (PQ)" means the priority queue (PQ) involved with the corresponding loop execution.

If it is determined at step 4-1 that a PDU was not received for the priority queue (PQ) during the evaluation period, processing continues with step 4-10 so a check can be made whether all priority queues have been handled. If all priority queues have not been handled, execution returns to step 4-1 for another execution of the loop for another priority queue (PQ).

As step 4-2, the number of bits received per PQF (e.g., for the priority queue (PQ) affected by this execution of the loop) during this evaluation period are counted or otherwise obtained. The counts is thus comparable to the number of bits received during the 100 ms period is accordingly reflected by the "number of PDU bits stored in PQ" parameter 76 in FIG. 2.

As step 4-3 the calculation logic checks the last sent value of a variable CaCreditsBitrate. If the value of last sent value of the variable CaCreditsBitrate equals zero, then as step 4-4 the calculation logic sets the capacity allocation utilization (depicted by the variable caUtil) for this priority queue (PQ) to one (1). If the last sent value of the variable CaCreditsBitrate is other than zero, then as step 4-5 the calculation logic makes its calculation of the capacity allocation utilization (caUtil) for this priority queue (PQ).

In an example implementation, the calculation of step 4-5 for each activePqf in the radio base station (RBS) for PQF 100 ms evaluation period is computed using Expression 1:

$$caUtil = \text{Received number of bits during the 100 ms period}/(CaCreditsBitrate * 0.1) \quad \text{Expression 1}$$

In Expression 1, the received number of bits during the 100 ms period is reflected by the parameter 76 in FIG. 2 (the number of PDU bits stored in a priority queue (PQ) during the evaluation period). The received number of bits are the correctly received 336 or 656 bits per PDU that are stored the Priority Queues per 100 ms.

The CaCreditsBitrate term of Expression 1 uses the caCreditsBitrate variable 74 shown in FIG. 2. A reason for using the caCreditsBitrate is that this is the bitrate that is signaled to RNC, the maximum bitrate that a user can use. The real received bitrate is compared with caCreditsBitrate. Another reason is that there is a hysteresis 'between' 'caCalcBitrate' and 'caCreditsBitrate'. As mentioned above with respect to step 4-3, if the last sent caCreditsBitrate is 0, the caUtil is 1. The caCreditsBitrate has the unit of bits per second, therefore the "*0.1" factor is used to match the 100 ms period.

Thus, the parameter caUtil is calculated at step 4-5 using Expression 1. In an example embodiment, the parameter CaUtil is constrained to specified range, e.g., between an upper limit and a lower limits, such as: 0<=caUtil<=1. When caUtil is lower than 0 (if that happens), it should be set to 0, when it is higher than 1 (it will be quite often), it should be set to 1. The range limits can be configurable (e.g., differently selected).

The caCreditsBitrate should reflect the Capacity Allocation control frame that was valid during the 100 ms evaluation period during which the received bits are counted. The previously sent capacity allocation (CA) should be used as the caCreditsBitrate, not the one that might be sent at 'this' time-tick. It is the 100 ms period before the present time-tick that is evaluated. The caCreditsBitrate (the CA message sent from RBS to RNC) that was valid at the beginning of the just elapsed 100 ms period shall be used, a capacity allocation (CA) which was sent 100 . . . 1000 ms ago. This method gives a better relationship, less skew, between received number of bits and a valid capacity allocation (CA), even if caUtil is averaged.

A next objective of calculator 62 is to compute the average capacity allocation utilization (avgCaUtil) for this priority queue (PQ). Before doing so, the calculation logic makes two precautionary checks at step 4-6 and step 4-7. The calculator 62 is notified when the priority queue (PQ) involved in the loop execution changes its status to active (e.g., makes a status transition). This notification is reflected by an event in FIG. 2 labelled as pqfState changing its state to activePqf. If it is determined at step 4-6 of the calculation logic that the pqf-State for the priority queue (PQ) involved in this execution of the loop just changed its state to activePqf (such that a "transition" flag is set), then as step 4-7 the calculation logic determines that the average capacity allocation utilization for this priority queue (PQ) will be one (1).

The check of step 4-6 is performed because it is not feasible to calculate avgCaUtil during the first 100 ms evaluation period time-tick after pqfState changes to activePqf The reason is that the pqfState transition can occur at any time before the 100 ms PQF time-tick, therefore the received number of bits is not relevant before the first time-tick.

As step 4-8 the calculation logic checks the iubCongestionIndicationFlag 72. If it is determined that the iubCongestionIndicationFlag 72 is set, then step 4-7 is performed to set the average capacity allocation utilization for this priority queue (PQ) will be one (1). The reason why avgCaUtil is set to one (1) at step 4-7 (if the iubCongestionIndicationFlag has been set to one during a 100 ms evaluation period) is to protect the avgCaUtil calculations. If caUtil is not set to one when an iubCongestionIndicationFlag has been set, then caUtil gets far too low when a lot of frame losses occur and the received bitrate is perceived as decreasing. This would be an incorrect indication.

If neither the iubCongestionIndicationFlag 72 is set nor the pqfState changed to activePqf for this priority queue (PQ) during this evaluation period, then as step 4-9 the calculation logic calculates the average capacity allocation utilization for this priority queue (PQ). Preferably the calculation of step 4-9 is performed using an expression such as Expression 2 (which is evaluated separately for each activePqf in RBS and PQF 100 ms evaluation period).

$$\text{avg}CaUtil = (1 - \text{delta}CaUtil)*\text{latest 100 ms } caUtil + \text{delta}CaUtil*\text{previous avg}CaUtil \quad \text{Expression 2}$$

As understood from the preceding discussion, the parameter caUtil is obtained from Expression 1. The parameter deltaCaUtil 70 is preferably (user) set as a constant, as explained below.

The averaging 'time constant' deltaCaUtil should be on a one second level. This makes the algorithm robust against different 'burstiness' structures of the user bit flows. The burstiness of the user traffic does not have to be considered when the time constant is long enough. A working assumption is that the parameter deltaCaUtil can be set to an example value such as 0.90, which gives a time constant of approximately 1 second (using 100 ms intervals).

The foregoing thus describes how the calculator 62 makes the average capacity allocation utilization (avgCaUtil) for a priority queue (PQ). Such calculation is made by calculator 62 for each active priority queue (PQ). After making the calculation for the particular priority queue (PQ) involved in an execution of the loop of step 4-1 through step 4-10 (and assuming all queues are being evaluated essentially simultaneously), a check is made at step 4-10 whether all active priority queues for the radio base station (RBS) have been calculated. If not, processing returns to step 4-1 for another execution of the loop for a next priority queue (PQ). If all active priority queues (PQs) have been calculated, calculator 62 turns execution over to estimator 64, as reflected by step 4-11 of FIG. 4. In view of the execution of the calculator 62 using the calculation logic of FIG. 4, the calculation of avgCaUtil for each active priority queue (PQ) has been refreshed, so that HSDPA flow controller 60 is now ready to execute estimator 64 for updating its estimates of estUuRate and rbsEstUuRate. If one of the users of a priority queue (PQ) is using a bitrate less than allocated, then updating the value of rbsEstUuRate may result in a lower rbsEstUuRate value, and thus result in more efficient capacity allocation (CA) for one or more priority queue (PQ) flows.

In an illustrated example implementation, the calculation of rbsEstUuRate (the sum over all active priority queues of the radio base station of product, for each active priority queue, of the average capacity allocation utilization and the estimated bitrate of the priority queue over the air interface) is performed by the RBS real bit rate estimator 66 portion of estimator 64 in accordance with Expression 3:

$$rbsEstUuRate = \text{sum}(\text{avg}CaUtil*estUuRate) \quad \text{Expression 3}$$

In Expression 3, the avgCaUtil for each priority queue ($PQ_i$) is obtained from calculator 62 (see output 78 of calculator 62 in FIG. 2 and input 78 to estimator 64 in FIG. 3). The variable estUuRate is an estimated future Air Interface service rate of the given Priority Queue. The variable estUuRate is estimated by the Flow Control Algorithm and the Air Interface Scheduler based on past scheduling history, current radio conditions, and current Priority Queue fill level.

Thus, unlike the nominal HSDPA flow approach, the output rbsEstUuRate of the RBS real bit rate estimator 66 portion of estimator 64 reflects the real bitrate usage rather than the maximum possible bitrate given by the Capacity Allocation control frames sent to RNC. By including the average capacity utilization (e.g., avgCapUtil) of each priority queue in the calculation for rbsEstUuRate, the allocation of all priority queues will increase in a situation in which a user was not using his entire capacity allocation.

In an example mode of operation, the capacity allocation bitrate is adjusted by capacity allocation adjuster 65. The capacity allocation bitrate adjustment for a priority queue (i) is performed as a function of terms such as those shown in Expression 4. In Expression 4, "BNA" is an Iub Bottleneck Approximator (a value in kbps approximating the available Iub Transport Network Capacity). Thus, if the rbsEstUuRate is reduced, then the CA bitrate for a priority queue PQ(i) will be increased if the Iub Interface of the transport network is limiting.

$$CA_{PQ(i)} = f(estUuRate(i)/rbsEstUuRate*BNA) \quad \text{Expression 4}$$

The nominal HSDPA flow approach only permitted reduction in the value of the estUuRate parameter when, in conjunction with defining or checking a parameter known as pqIubRate, and specifically if factor targetHsRate/rbsEstUuRate utilized in the definition of parameter pqIubRate was less than one (and thereby reflecting an Iub bottleneck). Yet the present HSDPA flow controller 60 introduces the parameter caUtil, so that the variable rbsEstUuRate can be reduced to low values. To avoid allocating a higher bitrate than available over Iub to any single user, the calculation of pqIubRate is changed to be that of Expression 5. This can happen for example if a user who is limited by an application server bottleneck suddenly starts to download from a different application server, this Iub Flow Control algorithm drawback should be avoided.

$$pqIubRate=\min(1, estUuRate/rbsEstUuRate)*targetHsRate \quad \text{Expression 5}$$

In view of HSDPA flow controller 60, it is thus possible to allocate bandwidth not used by a particular priority queue (PQ) to one or more other priority queues (PQs). In view of such reallocation, the transport network is better utilized, while congestion control still works for the interface.

FIG. 5A-FIG. 5D reflect a simulation in which the HSDPA flow controller 60 as described above with reference to FIG. 2, FIG. 3, and the steps of FIG. 4 (including calculation of caUtil) is applied to essentially the same factual circumstances as the simulation of FIG. 8A-FIG. 8D.

Figure 5A:
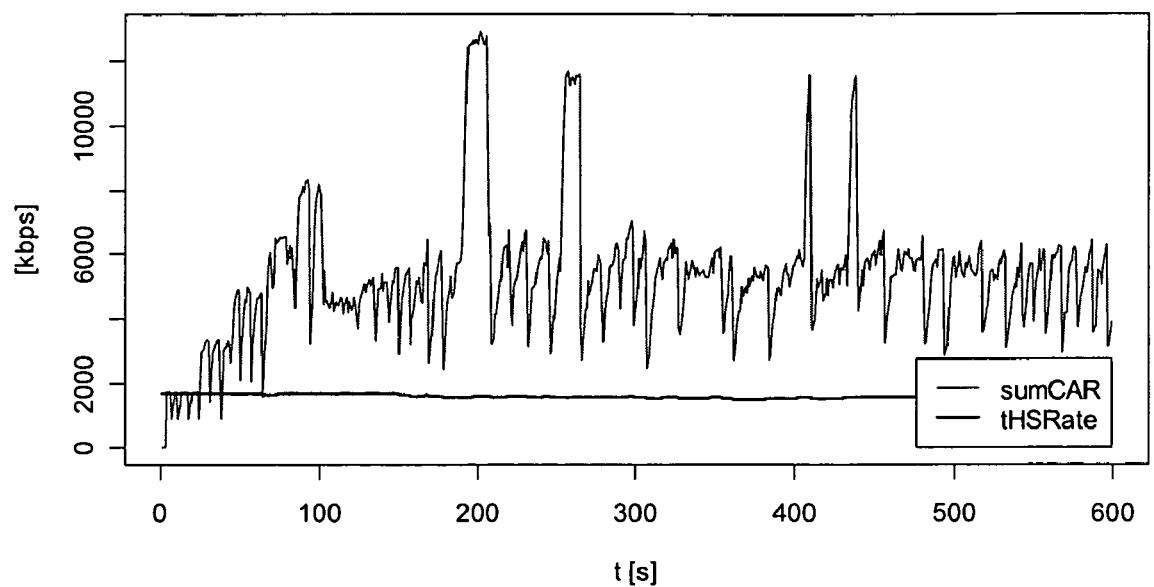
FIG. 5A-FIG. 5D are graphical views depicting a simulation of an improved HSDPA flow control process.

FIG. 5A illustrates the targetHSRate and the sum of all capacity allocation (CA) rates. In FIG. 5A the amount of transport network resources to be distributed (tHSRate) and the sum of capacity allocation (CA) rates allocated for all PQs (sumCAR) are depicted. Compared to FIG. 8A, it can be seen that the sum of CA rates allocated in FIG. 5A for all PQs is much higher. Thus, introducing the caUtil calculation results in allocating the capacity not used for a given PQ to other PQs.

Figure 5B:
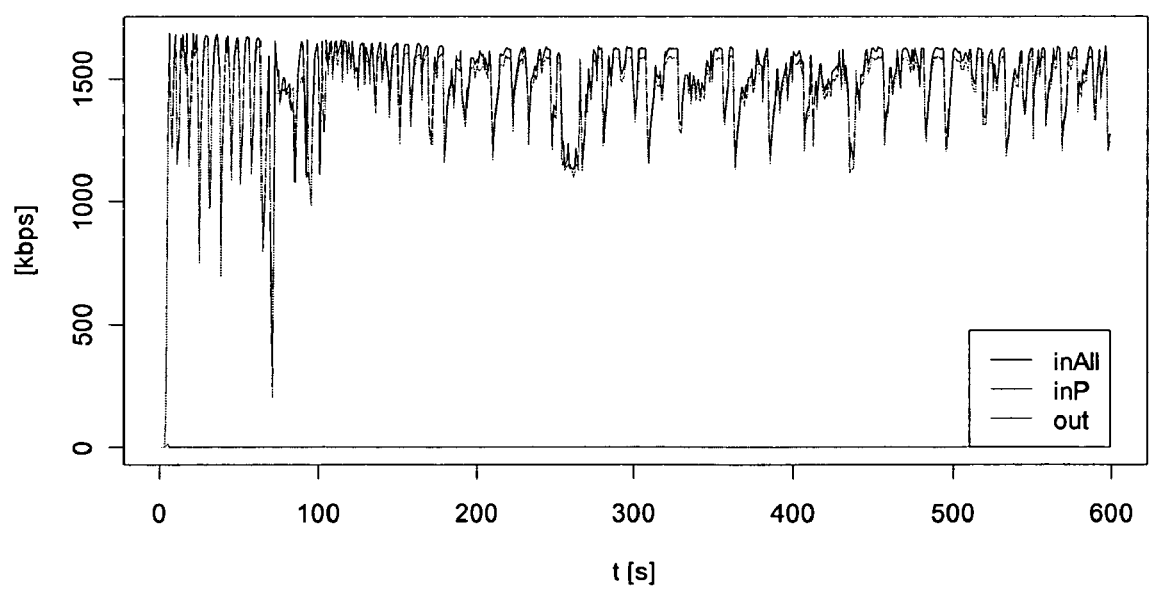

FIG. 5B shows incoming and outgoing PDU rate in the RBS. In FIG. 5B, it can be seen that the available transport network resources are much more utilized. FIG. 5B depicts the incoming PDU rate to the RBS (in All) and the outgoing PDU rate from the RBS (out). The passive flows (in P) are drawn in the FIG. 5B, but out of scope for the presentation. The average utilization of the transport network was also measured during the simulation and resulted 92%.

Figure 5C:
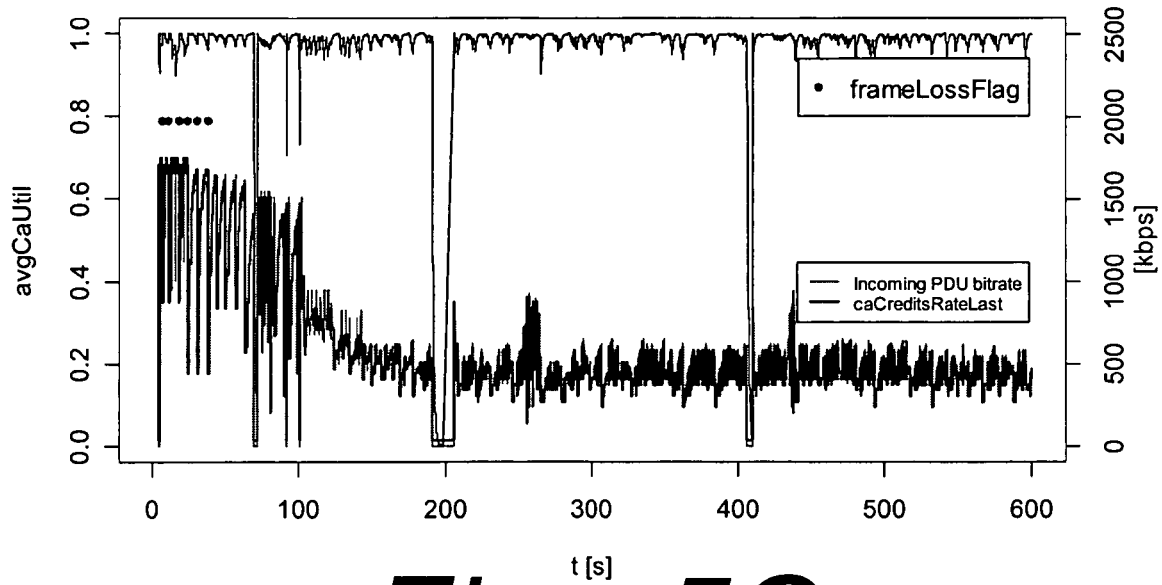
Figure 5D:
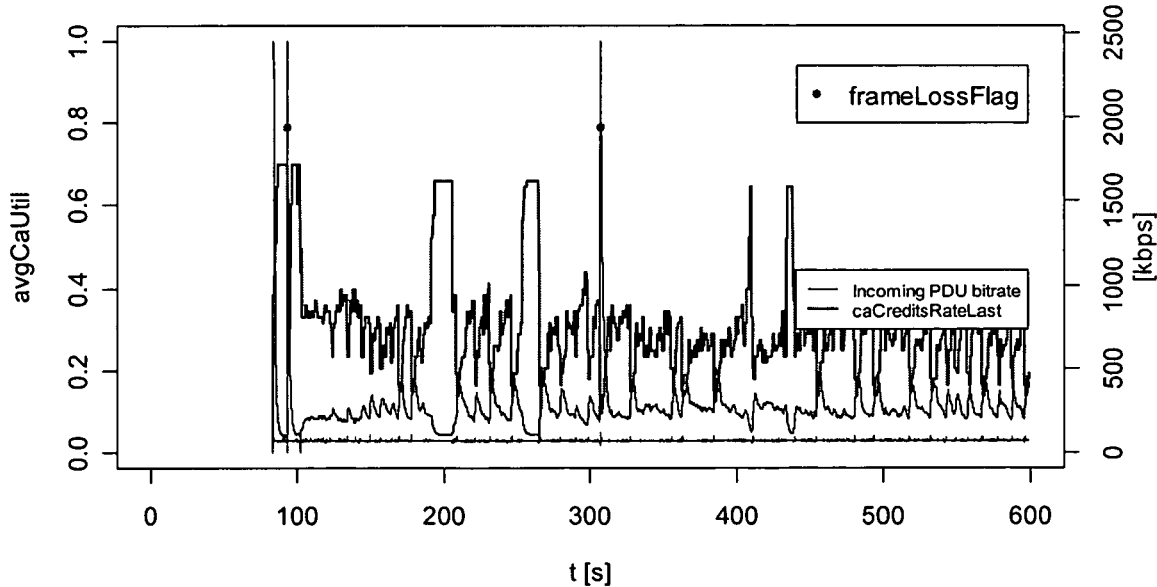
Figure 6:
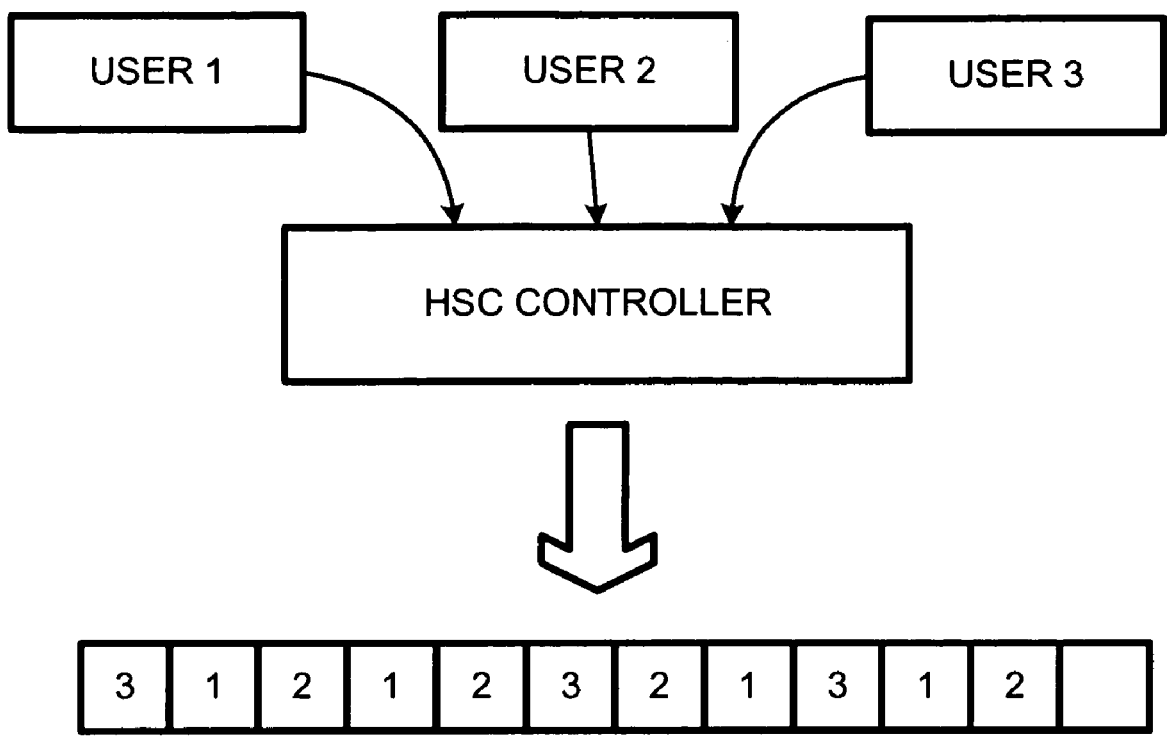
FIG. 6 is a diagrammatic view of a high-speed shared channel concept.
Figure 7:
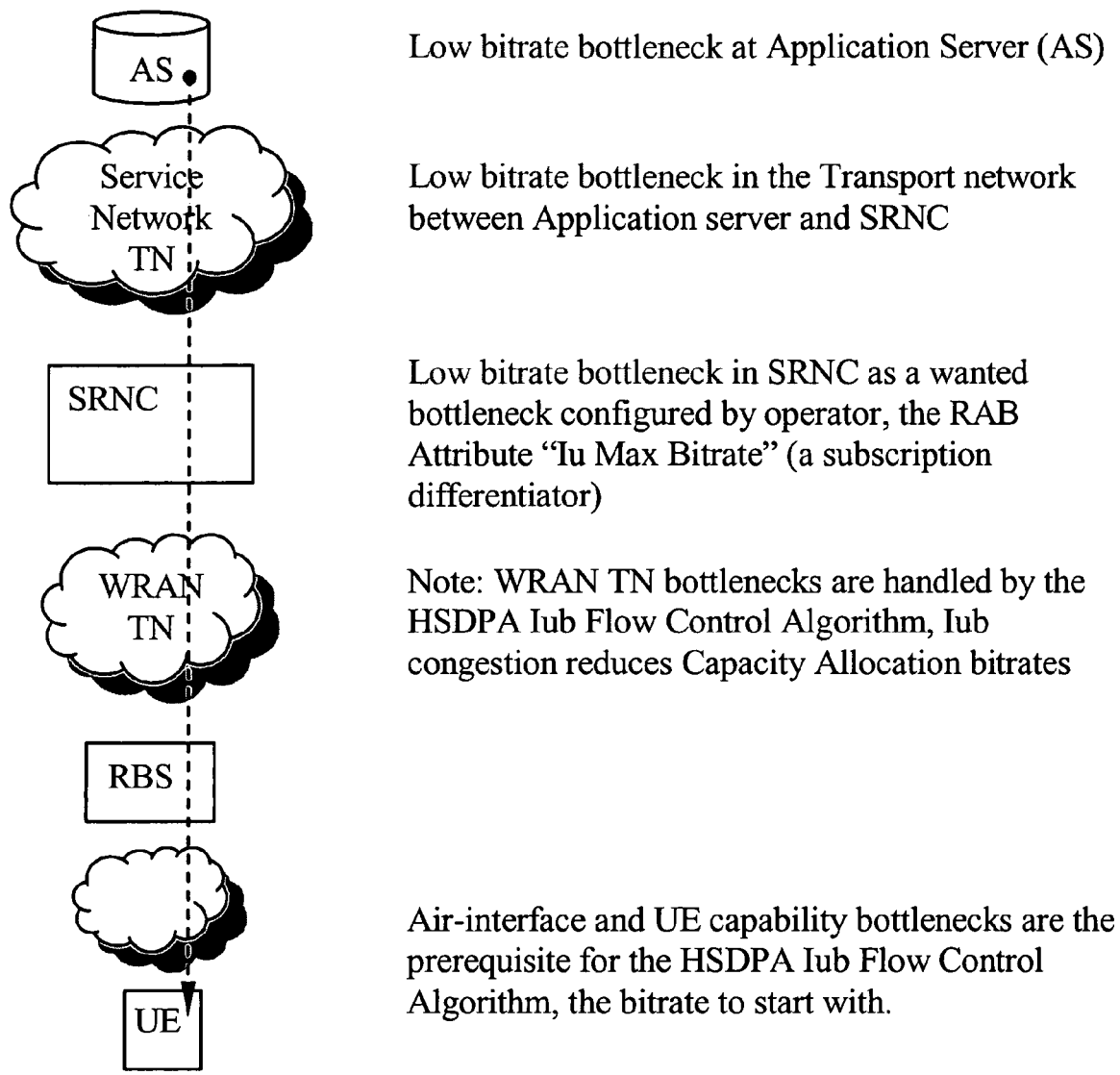
FIG. 7 is a graphical view depicting low bitrate bottlenecks of a nominal HSDPA Iub Flow Control approach.
Figure 8A:
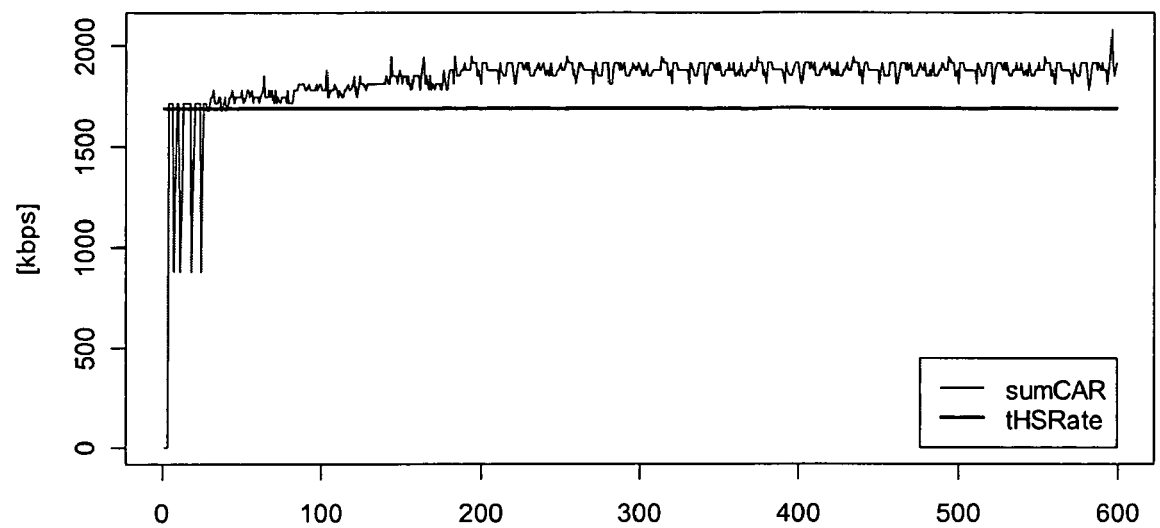
FIG. 8A-FIG. 8D are graphical views depicting a simulation of the nominal HSDPA flow control approach.
Figure 8B:
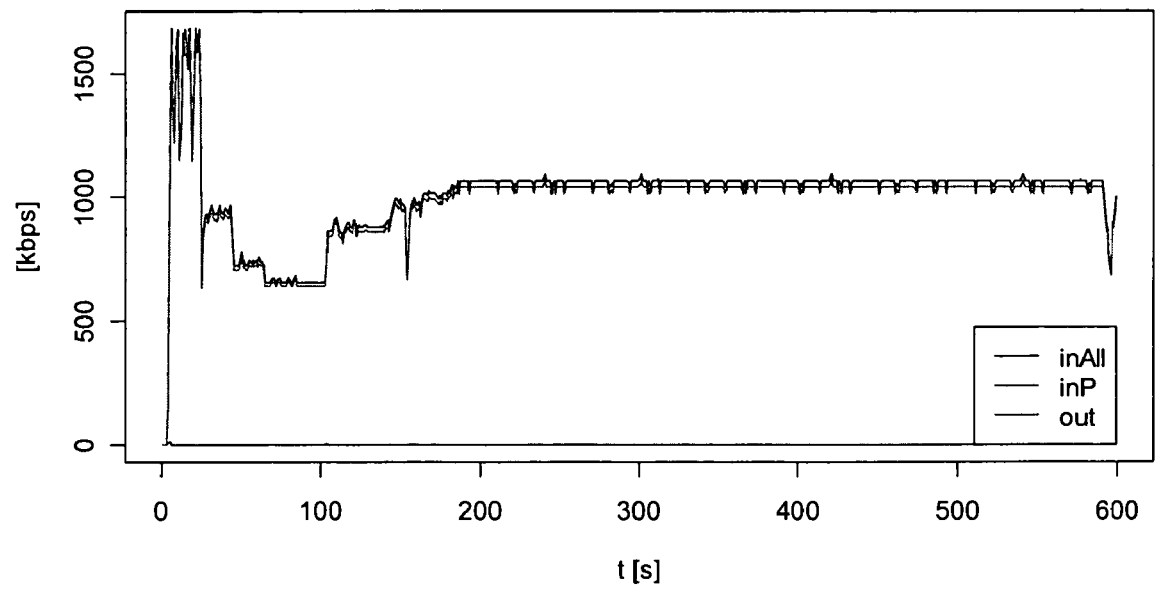
Figure 8C:
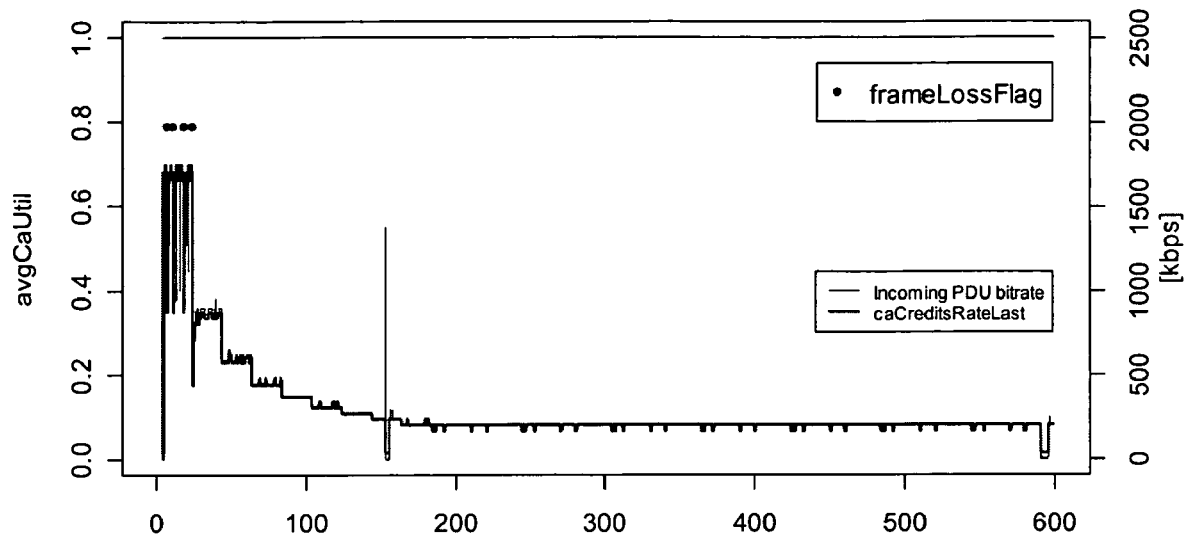
Figure 8D:
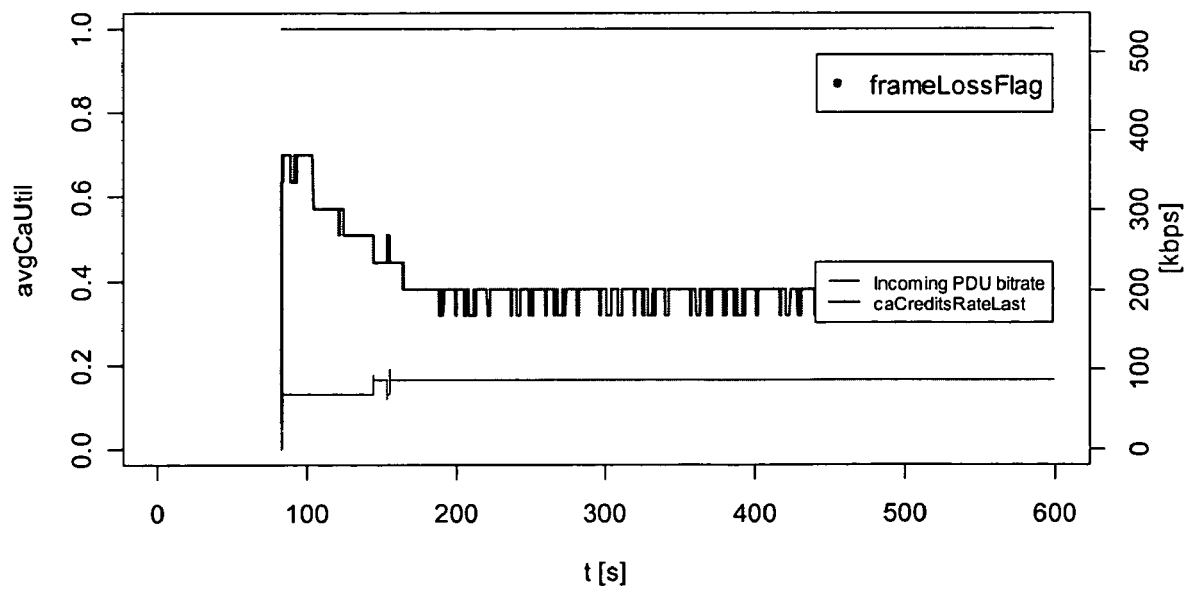

In FIG. 5C and FIG. 5D the Capacity allocated (caCreditsRateLast) for the given user and the capacity used by the given user (Incoming PDU bitrate) is depicted for users 0 and 4. The black line in FIG. 5C and FIG. 5D depicts the avgCaUtil value.

In FIG. 5C it can be seen that the user with identifier0 can download with much higher rate than previously. In FIG. 5D it can be seen that the capacity allocated for user with identifier4 is similar to the capacity allocated for user with identifier0, but as this user uses much less of this capacity its avgCaUtil value is small. Introduction and use of caUtil solution increased significantly the utilization of the transport network (from 62% to 92%).

Thus, the HSDPA flow control logic described herein can advantageously used when a priority queue (PQ) flow does not use the capacity allocated for it by the capacity allocations. Use of the flow control logic described herein, when a priority queue (PQ) flow uses significantly smaller capacity than granted to it, minimizes or even precludes degradation of the Iub transport network. The logic and method described herein detects utilization of the capacity allocated to each priority queue (PQ), and adjusts the calculation method of capacity allocation (CA) messages accordingly.

The HSDPA flow control logic described herein considers that users (e.g., their priority queue (PQ) flows) often do not use the maximum allowed bitrate. A new functionality provided herein is that the real bitrate that the active users have is compared with targetHsRate instead of just comparing with the granted capacity allocation (CA) bitrate. The granted capacity allocation (CA) bitrate is the maximum possible bitrate. The result is that capacity allocations are not reduced when many of the real bitrates are lower than the granted capacity allocations. This improves the Iub HSDPA bitrate utilization when the granted capacity allocations (caCreditsBitrate) are higher than targetHsRate. Thus, the Iub HS bandwidth utilization gets better.

The techniques described herein assume a limited bandwidth on the interface with the superior node, e.g., on the Iub interface between the radio base station and the radio control node. These techniques consider the capacity allocation bitrate a poor indicator when the actual capacity allocation utilized by a priority queue is low. The HSDPA flow controller 60 therefore measures the real bitrate ("utilized" bitrate or capacity allocation) and adjust the capacity allocations using the utilization when comparing with the Iub bitrates. The HSDPA flow controller 60 decreases the reference (e.g., rbsEstUuRate) for dividing the transport network resources using the utilized capacity allocation (e.g., caUtil). By this the HSDPA flow controller 60 divides the same resource more than once if the capacity allocation utilization is high.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A radio access network node which provides High Speed Downlink Packet Access (HSDPA) comprising:
    a priority queue for receiving and storing data which is to be sent on a High Speed Downlink Shared Channel (HS-DSCH) over an air interface to a mobile terminal, the priority queue receiving the data over an interface with a superior node in accordance with a capacity allocation;
    a flow controller configured to measuring actual utilization of the capacity allocation for the priority queue and to adjust the capacity allocation in dependence upon the actual utilization by performing the following acts:
        counting received bits for the priority queue during a current evaluation period;
        determining a capacity allocation utilization caUtil for the priority queue to be 1 last sent value of a variable CaCreditsBitrate is zero;
        determining the capacity allocation utilization caUtil for the priority queue in accordance with Expression 1 if the last sent value of a varible CaCreditsBitrate is non-zero, Expression 1 being as follows: caUtil=Received number of bits during the current evaluation period/(CaCreditsBitrate*0.1);
        calculating an average capacity allocation utilization avgCaUtil for the priority queue using Expression 2, Expression 2 being avgCaUtil=(1−deltaCaUtil)*caUtil+deltaCaUtil*previous avgCaUtil, wherein deltaCaUtil is an averaging time constant and wherein previous avgCaUtil is a previous value of the average capacity allocation utilization avgCaUtil for the priority queue.

2. The apparatus of claim 1, wherein the radio access network node comprises plural priority queues for respective plural data flows, and wherein the flow controller separately measures actual utilization of capacity allocation for each of the plural priority queues.

3. The apparatus of claim 1, wherein the flow controller adjusts the capacity allocation by dividing transport network resources among different plural priority queues, the dividing of the transport network resources involving multiplying a resource use of a given priority queue with the actual utilization of the capacity allocation for the priority queue.

4. A method of operating a radio access network node comprising:
   providing High Speed Downlink Packet Access (HSDPA) on a High Speed Downlink Shared Channel (HS-DSCH);
   storing, in a priority queue at a node of the network, data which is received over an interface from a superior node in accordance with a capacity allocation and which is to be sent on the High Speed Downlink Shared Channel (HS-DSCH) over an air interface to a mobile terminal;
   measuring actual utilization of the capacity allocation for the priority queue; and
   adjusting the capacity allocation for the priority queue in dependence upon the actual utilization by performing the following acts:
      counting received bits for the priority queue during a current evaluation period;
      determining a capacity allocation utilization caUtil for the priority queue to be 1 if a last sent value of a variable CaCreditsBitrate is zero;
      determining the capacity allocation utilization caUtil for the priority queue in accordance with Expression 1 if the last sent value of a varible CaCreditsBitrate is non-zero, Expression 1 being as follows: caUtil=Received number of bits during the current evaluation period/(CaCreditsBitrate*0.1);
      calculating an average capacity allocation utilization avgCaUtil for the priority queue using Expression 2, Expression 2 being avgCaUtil=(1−deltaCaUtil)*caUtil+deltaCaUtil*previous avgCaUtil, wherein delta CaUtil is an averaging time constant and wherein previous avgCaUtil is a previous value of the average capacity allocation utilization avgCaUtil for the priority queue.

5. The method of claim 4, further comprising measuring actual utilization of the capacity allocation for each of plural priority queues at the node, the plural priority queues storing data which is to be sent over the air interface for respective plural data flows.

6. The method of claim 5, further comprising dividing transport network resources among different plural priority queues, the dividing of the transport network resources involving multiplying a resource use of a given priority queue with the actual utilization of the capacity allocation for the priority queue.

7. A radio access network which provides High Speed Downlink Packet Access (HSDPA), the network comprising:
   a control node for configuring a High Speed Downlink Shared Channel (HS-DSCH) utilized by the High Speed Downlink Packet Access (HSDPA);
   a base station node comprising:
      a priority queue for storing data which is received over a control node interface in accordance with a capacity allocation and which is to be sent on the High Speed Downlink Shared Channel (HS-DSCH) over an air interface to a mobile terminal;
      a flow controller configured to measure actual utilization of an capacity allocation for the priority queue and to adjust the capacity allocation for the priority queue in dependence upon the actual by performing the following acts:
      counting received bits for the priority queue during a current evaluation period;
      determining a capacity allocation utilization caUtil for the priority queue to be 1 last sent value of a variable CaCreditsBitrate is zero;
      determining the capacity allocation utilization caUtil for the priority queue in accordance with Expression 1 if the last sent value of a varible CaCreditsBitrate is non-zero, Expression 1 being as follows: caUtil=Received number of bits during the current evaluation period/(CaCreditsBitrate*0.1);
      calculating an average capacity allocation utilization avgCaUtil for the priority queue using Expression 2, Expression 2 being avgCaUtil=(1−deltaCaUtil)*caUtil+deltaCaUtil*previous avgCaUtil, wherein delta CaUtil is an averaging time constant and wherein previous avgCaUtil is a previous value of the average capacity allocation utilization avgCaUtil for the priority queue.

8. The apparatus of claim 7, wherein the base station node comprises plural priority queues for respective plural data flows, and wherein the flow controller separately measures actual utilization of the capacity allocation for each of the plural priority queues.

9. The apparatus of claim 8, wherein the flow controller also divides transport network resources among different plural priority queues by multiplying a resource use of a given priority queue with the actual utilization of the capacity allocation for the priority queue.

* * * * *

UNITED STATES PATENT AND TRADEMARK OFFICE
CERTIFICATE OF CORRECTION

PATENT NO. : 7,564,788 B2
APPLICATION NO. : 11/292304
DATED : July 21, 2009
INVENTOR(S) : Lundh et al.

It is certified that error appears in the above-identified patent and that said Letters Patent is hereby corrected as shown below:

In Column 14, Line 47, in Claim 1, after "to be 1" insert -- if a --.

In Column 14, Line 51, in Claim 1, delete "varible" and insert -- variable --, therefor.

In Column 15, Line 30, in Claim 4, delete "varible" and insert -- variable --, therefor.

In Column 16, Line 23, in Claim 7, after "to be 1" insert -- if a --.

In Column 16, Line 27, in Claim 7, delete "varible" and insert -- variable --, therefor.

Signed and Sealed this

Twenty-fourth Day of November, 2009

David J. Kappos
*Director of the United States Patent and Trademark Office*